Feb. 26, 1957 L. W. WIGHTMAN 2,783,069
MEANS FOR HOLDING PARTS ON A SHAFT
Filed Jan. 4, 1954 2 Sheets-Sheet 1
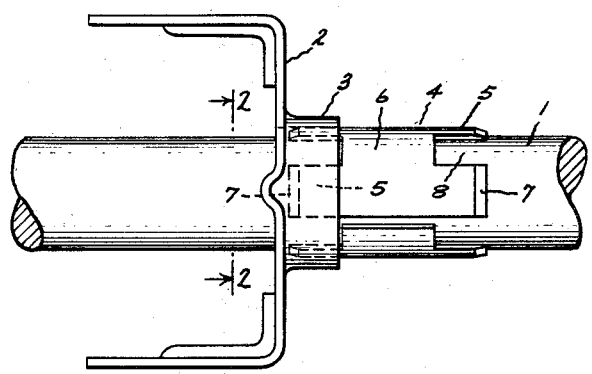
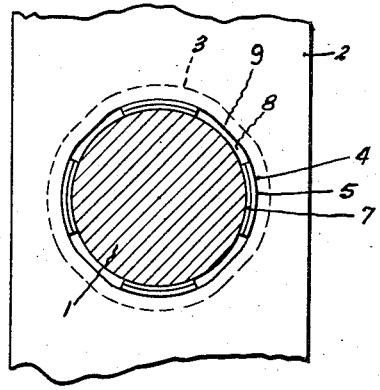
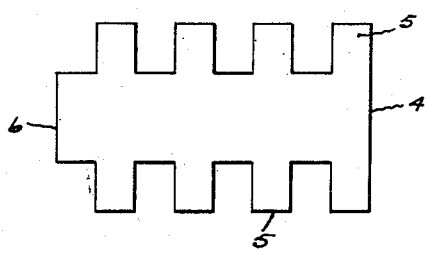
Inventor:
Lawrance W. Wightman,
by
His Attorney.

Feb. 26, 1957 L. W. WIGHTMAN 2,783,069
MEANS FOR HOLDING PARTS ON A SHAFT
Filed Jan. 4, 1954 2 Sheets-Sheet 2
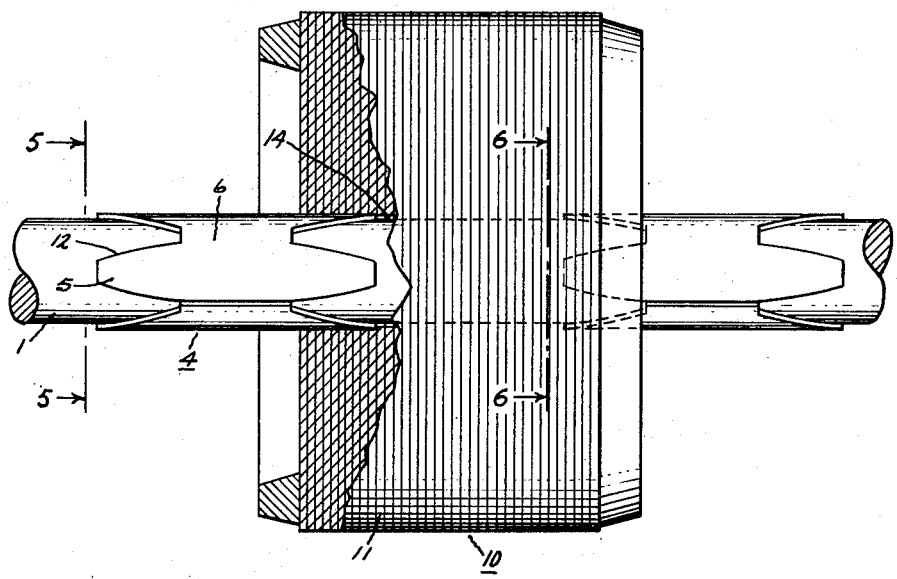
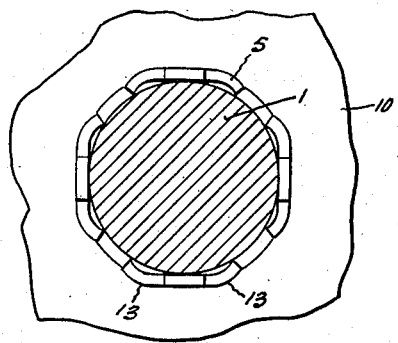
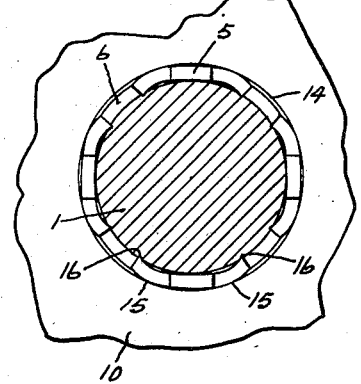
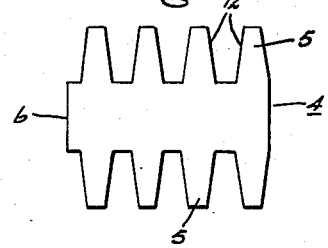
Inventor:
Lawrance W. Wightman,
by
His Attorney.

United States Patent Office 2,783,069
Patented Feb. 26, 1957

2,783,069

MEANS FOR HOLDING PARTS ON A SHAFT

Lawrence W. Wightman, Fort Wayne, Ind., assignor to General Electric Company, a corporation of New York Application January 4, 1954, Serial No. 401,792

4 Claims. (Cl. 287—52)

This invention relates to securing means and more particularly to improved means for holding rotating parts on a shaft.

It is frequently necessary to secure parts to a rotatable shaft in applications where the forming of keyways in the shaft is undesirable, as, for instance, for reasons of economy or strength. However, whatever the economics of the situation, there remains the prerequisite that parts secured to rotate with a shaft must be so firmly attached as to obviate even the slightest possibility of their loosening. Where a part is to be secured to the end of a shaft the result may be achieved by press fitting the part around the shaft. This solution ceases to be satisfactory when the part is to be secured at a distance from either end of the shaft. In such a case a press fit would greatly mar the shaft between the end thereof and the point at which the piece is to be secured, thereby causing unbalance, vibrations, poor bearing surface, and a variety of other objectionable features. It is, therefore, necessary to secure the parts to the shaft in the simplest way possible as economically as possible, and without permanent injury to either the part or the area of the shaft between the part and the end of the shaft.

An object of this invention is, therefore, to provide improved means to secure a part to a rotatable shaft, which means will embody the desirable features set forth above.

Further objects and advantages of this invention will become apparent and the invention will be better understood by reference to the following description and the accompanying drawings; and the features of novelty which characterize this invention will be pointed out with particularity in the claims annexed to and forming a part of this specification.

This invention, in one embodiment thereof, provides a flat piece of sheet metal rolled into a bushing and loosely fitted over a shaft. The ends of the bushing are formed into fingers extending from the body thereof. The part to be secured to the shaft is tightly fitted over the end of the bushing over a substantial axial length relative to the shaft so that either the part or the bushing will have a substantially different configuration in cross section from that which it has in its normal unbiased condition, thereby becoming tightly secured to the bushing. In addition, the pressure of the fit of the part around the bushing secures the bushing to the shaft. In a second embodiment the bushing of this invention is formed with tapered fingers and is composed of a spring material. The fingers are formed with curved edges which tend to bite into the shaft. When a part to be secured to the shaft is tightly fitted over the fingers of the bushing they will flatten out and by their spring action secure the part to the shaft. It is in addition desirable in this latter embodiment that the inner edges of the fingers bite into the shaft surface slightly to afford greater holding power.

In the drawings, Figure 1 is a top view of a part secured to a shaft by the novel bushing of this invention;

Fig. 2 is a view of the improved holding means of this invention along line 2—2 of Figure 1;

Figure 3 is a plan view of the punched out strip of metal from which the improved bushing is formed;

Figure 4 is a side view, partly in cross section, of the rotor of an electric motor held on a shaft by a modification of the improved holding means;

Figure 5 is a view of the bushing along line 5—5 of Figure 4, before the part to be held is placed around it;

Figure 6 is a view along line 6—6 of Figure 4 showing the improved bushing in holding position; and Figure 7 is a plan view of the strip of metal from which the modified bushing is formed.

Referring now to Figures 1, 2 and 3 of the drawings, there is shown a rotatable shaft 1 to which a member such as bracket 2 is to be firmly secured. Bracket 2 is formed with a hub section 3 whose inner diameter is appreciably greater than the diameter of shaft 1. A piece of relatively thin flat metal 4 is provided having fingers 5 extending from each side of a central section 6. This piece may be formed by stamping, or by any other well known means. The flat piece 4 of Figure 3 is then rolled or otherwise formed into shape as shown in Figure 1 so as to have a loose fit about shaft 1. The end of each finger 5 is preferably chamfered as shown at 7. The outer diameter of bushing 4 and the inner diameter of hub 3 of bracket 2 are such that a press fit is required to force hub 3 over fingers 5 when bushing 4 is slipped onto shaft 1. Chamfered surfaces 7 are provided on fingers 5 so that when hub 3 is press fitted over the fingers there will not be undue injury and deformation caused to the various engaging pieces. It will be seen that fingers 5 and hub 3 are in engagement with each other over a substantial axial distance relative to shaft 1 so as to afford an adequate area for holding purposes.

Referring now specifically to Figure 2, there is shown a view of the shaft 1 and the bushing 4 after bracket 2 has been mounted thereon. It will be observed that between each of the fingers 5 there is a space 8. When hub 3 is press fitted over fingers 5 it will be deformed so that in the areas 8 between the fingers, its surface is substantially plane, as shown at 9. In effect, fingers 5 have been forced from the predetermined configuration in cross section which they had in their unbiased condition to a different configuration so as to effect a holding together of the parts over the areas 8 between the fingers, as at 9. This deformation or chording, as shown at 9 permits hub 3 to be so tightly fitted over fingers 5 that if fingers 5 extended solidly around shaft 1 hub 3 would crack. However, because of the chording caused by the provision of spaces 8 the danger of cracking is obviated while maintaining the extremely tight fit desired.

It will be seen that by the provision of a bushing having fingers extending from an end thereof a part may be fitted onto a shaft very securely and tightly without the necessity for a keyway or other holding means such as screws.

Referring now to Figure 4 of the drawings, there is shown a modification of the invention in which parts equivalent to those of Figure 1 will be given like numerals. A shaft 1 is provided, and a rotor 10 made up of laminations 11 is to be mounted thereon. It is clearly impractical to press fit rotor 10 over bushing 4; therefore the bushing 4 has been modified in Figure 4 so that rotor 10 may be easily and securely maintained on shaft 1.

Referring for an instant to Figure 7 it will be seen that modified bushing 4 has four fingers 5 extending from each end, each of the fingers having tapered sides as at 12. Returning now to Figure 4 it may be observed that bushing 4 is rolled into a circular shape as before and is loosely fitted over shaft 1. Referring to Figure 5, a view of fingers 5 in their relaxed state will be seen.

It will be observed that each finger 5 is curved at each side as at 13. This curvature at 13 causes fingers 5 to extend away from shaft 1 a greater distance than is permissible if the fingers are to enter the opening 14 in rotor 10. However, since the fingers are resilient they will flatten out in each of the curved spots, as shown at 15, as the rotor 10 is forced over the bushing 4. In addition to this flattening out of fingers 5 the fingers may be designed, if it is so wished, so that corners 16 are sharp and will bite into shaft 1 when rotor 10 is forced over bushing 4. When rotor 10 is positioned as shown in Figure 4, flattened out portions 15 will tend to return to their normal shape as shown at 30. This will cause each finger 5 to bear against the inner bore of rotor 10 at points 15 and against shaft 1 at points 16 with sufficient force to maintain the rotor securely on shaft 1. Thus it will be seen that the second embodiment of this invention provides simple and economical means for securely maintaining a part, such as rotor, on a shaft.

In both embodiments of this invention the holding means may be easily and economically made from sheet metal, with resiliency being a more important factor in the modified bushing of Figures 4 through 7.

While this invention has been explained by describing particular embodiments thereof, it will be apparent that improvements and modifications may be made without departing from the scope of the invention as defined in the appended claims.

What I claim as new and desire to secure by Letters Patent of the United States is:

1. In combination, a shaft, a part positioned over said shaft having a bore with a larger diameter than the outer diameter of said shaft, said part forming a first unit, and means securing said part to said shaft comprising a tubular bushing member positioned on said shaft, said bushing member having a plurality of fingers extending from an end thereof, said fingers being substantially spaced from each other in a circumferential sense and forming a second unit, at least one of said units being formed of thin sheet material, at least a portion of the outer surface of each said finger extending radially from said shaft a distance greater than half the difference between the diameter of said bore and the diameter of said shaft, said fingers extending into said bore a substantial axial distance relative to said shaft, one of said units having a predetermined unbiased configuration in cross section extending substantially over said axial distance, said one unit having a different configuration in cross section over said axial distance from its unbiased configuration when said shaft, said part and said bushing member are in their assembled relationship.

2. In combination, a shaft, a part having a hub portion of thin sheet material having in an unbiased condition a circular shape with an inside diameter larger than the outer diameter of said shaft, said part being positioned over said shaft, and means for securing said part to said shaft comprising a tubular bushing positioned around said shaft, said bushing having a plurality of fingers extending from an end thereof, said fingers being substantially spaced from each other in a circumferential sense, at least a portion of the outer surface of each said fingers extending radially from said shaft a distance greater than half the difference between the inside diameter of said hub portion and the diameter of said shaft, said fingers extending into said hub portion a substantial axial distance relative to said shaft, the surface of said hub portion being substantially plane between said fingers when said shaft, said part and said bushing are in their assembled relationship.

3. The combination of claim 2 wherein said fingers are substantially equispaced, each said finger further having a chamfer formed in the upper portion of its outer end.

4. In combination, a shaft, a part positioned over said shaft having a bore with a larger inside diameter than the outer diameter of said shaft, and means for securing said part to said shaft comprising a bushing of thin sheet spring material positioned on said shaft, said bushing having a plurality of fingers extending from one end thereof, said fingers being substantially spaced from each other in a circumferential sense, each said finger being positioned with its side edges touching said shaft and at least part of the remainder of said finger formed so that in an unbiased condition the outer surface of said part is radially spaced from said shaft an amount greater than half the difference between the diameter of said bore and the diameter of said shaft and the inner surface of said part is spaced from said shaft, said part being positioned over said fingers over a substantial axial distance relative to said shaft, said fingers having a predetermined unbiased configuration in cross section extending substantially over said axial distance and having a different configuration in cross section over said axial distance when said shaft, said part and said bushing member are in their assembled relationship.

References Cited in the file of this patent

UNITED STATES PATENTS

| | | |
|---|---|---|
| 234,343 | Stedman | Nov. 9, 1880 |
| 2,087,384 | Lee | July 20, 1937 |

FOREIGN PATENTS

| | | |
|---|---|---|
| 549,714 | France | Nov. 28, 1922 |
| 581,955 | Great Britain | Oct. 30, 1946 |